Dec. 7, 1965  W. F. STACKHOUSE  3,221,526
METER PADLOCK

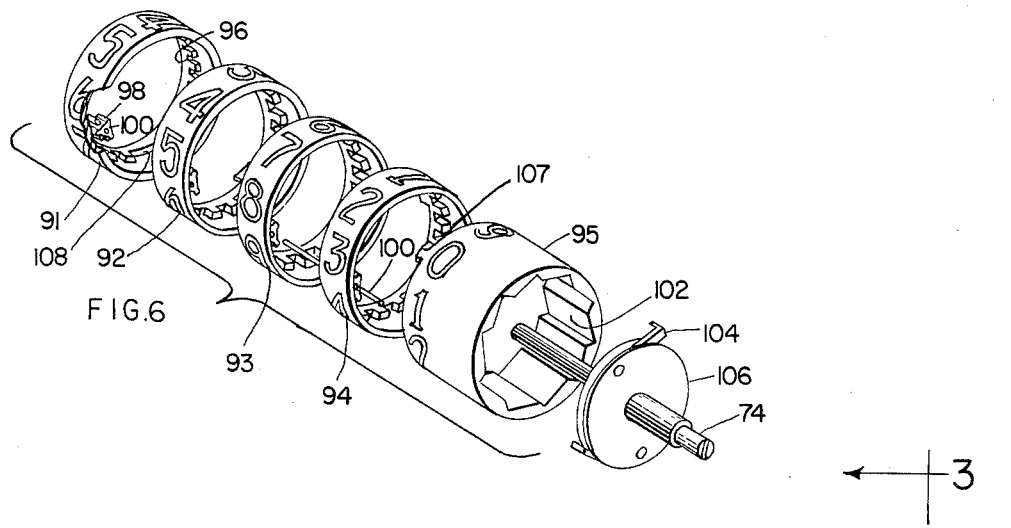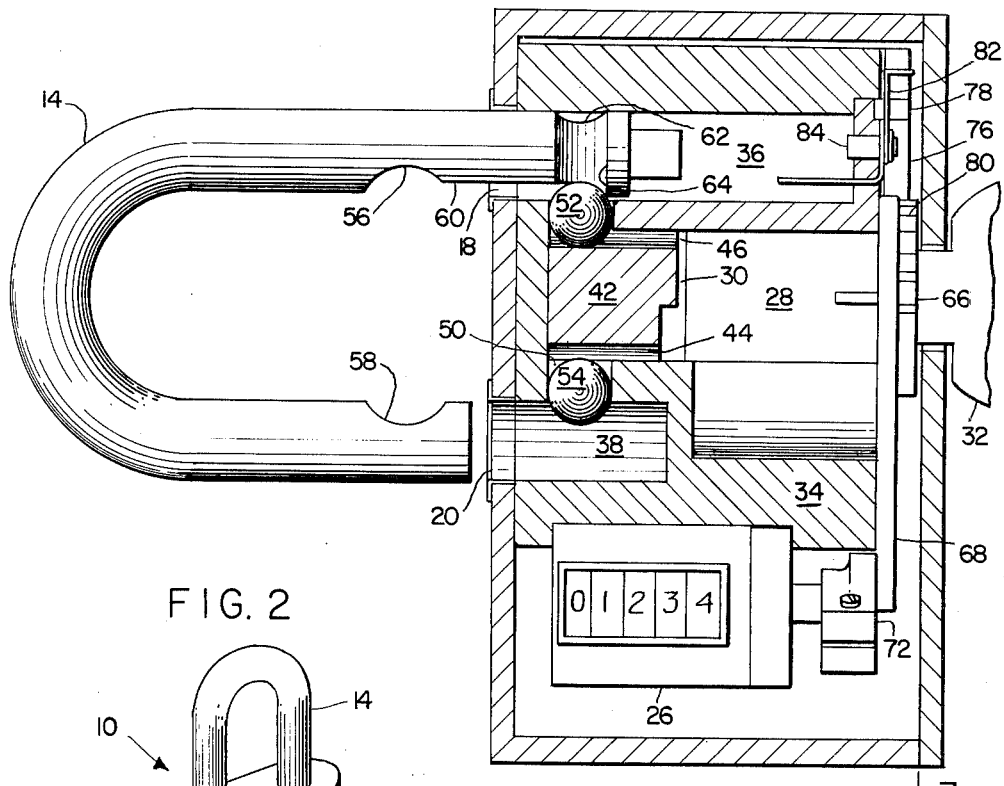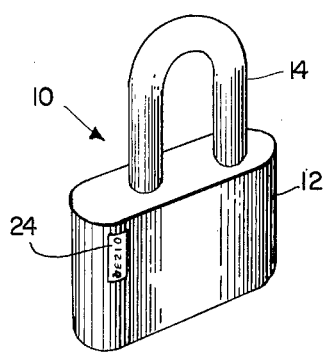

Filed July 23, 1962  2 Sheets-Sheet 2

INVENTOR.
WELLS F. STACKHOUSE

BY
Morse & Altman

ATTORNEYS

3,221,526
METER PADLOCK
Wells F. Stackhouse, 126 Lowell St., Andover, Mass.
Filed July 23, 1962, Ser. No. 211,645
11 Claims. (Cl. 70—437)

This invention relates generally to padlocks and more particularly is directed towards a new and improved meter padlock having self-contained, automatic tabulating means providing a positive and accurate record of lock operation. This invention is also directed towards an improved mechanism for locking the hasp of a padlock.

In many enterprises such as the operation of storage and warehousing facilities, for example, it is important that management know with complete confidence that the security of a particular padlocked building, room or other enclosed area has not been broken while left unattended. Similarly, both the shipper and receiver of all types of padlocked containers should be able to establish positively that no unauthorized opening of the container has taken place in transit. Numerous other operations have a need for a small, portable lock which will operate efficiently and which will provide its own tamper-proof record of lock operation.

While I am aware that there have been available heretofore padlocks with built-in meters, I am not aware of any meter type padlock which is completely effective against undetected tampering.

Accordingly, it is a general object of the present invention to provide a padlock of improved construction and operation.

A more particular object of this invention is to provide a padlock of extremely rugged and durable construction and one which cannot be opened without automatically recording such opening.

Another object of this invention is to obviate tampering of padlocks by the provision of improvements in meter type padlocks.

More particularly this invention features a padlock in which the locking mechanism is connected to a meter for automatically recording each opening of the lock. The connection between the meter and the lock is such that it is impossible to operate the lock without advancing the meter. As another feature of this invention, unauthorized cycling of the meter is prevented by the provision of a limited accumulation type counter mechanism. Such a mechanism avoids the possibility of the meter being returned to any given number by cycling of the meter through repeated operation of the lock. A further feature of this invention relates to a hasp locking mechanism involving a pair of hard metal balls, one for either leg of the hasp, which are moved into and out of locking engagement with the hasp by means of a grooved cylinder operatively connected to the lock barrel. Both legs of the hasp are formed with ball receiving indents whereby the hasp may be locked when the cylinder is rotated to one of two operating positions.

But these and other features of the invention, along with further objects and advantages thereof, will become more fully apparent from the following detailed description of a preferred embodiment of the invention, with reference being made to the accompanying drawings in which:

FIG. 1 is a view in perspective of a padlock made according to the invention,

FIG. 2 is a sectional view in side elevation of the padlock,

Figure 3:
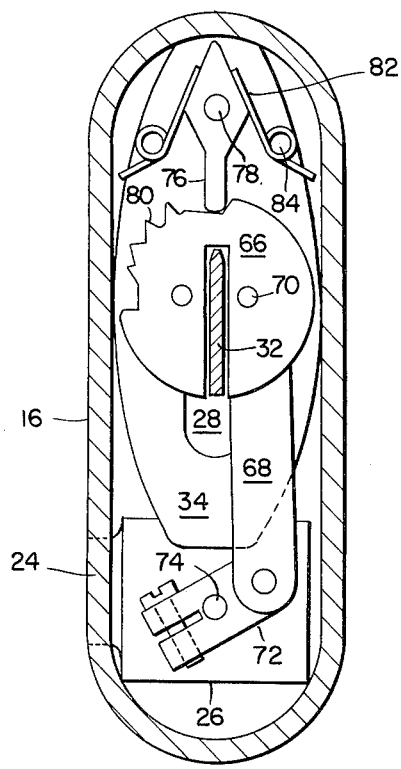
FIG. 3 is a cross-sectional view taken along the line 3—3 of FIG. 2.

Referring now to the drawings, the reference character 10 generally indicates a padlock having a body portion 12 and a shackle or hasp portion 14. The body portion 12 is characterized by a one-piece outer steel jacket 16 of welded construction, encasing the lock mechanism in such a manner that the jacket cannot be opened without causing permanent damage to the unit.

The lock body 12 is formed with the usual hasp openings 18 and 20 located in its upper portion and a key opening 22 located in its bottom portion. In addition, a rectangular window 24 is provided in the front wall of the jacket 16 to expose the face of a counter mechanism 26 mounted within the jacket. Preferably, a transparent mask of glass or hard plastic material is mounted in the window to prevent direct access to the counter mechanism and to protect it from the elements.

Mounted also within the jacket 16 and in operative engagement with the counter is a lock mechanism comprising a cylinder case 28 carrying a rotatable plug element 30 operated by an appropriate key 32. The entire locking mechanism is mounted in a block 34 which is formed with a pair of parallel cylindrical recesses 36 and 38 in register with the openings 18 and 20 respectively. These recesses accommodate the two legs of the hasp 14 with one recess being deeper than the other as shown.

These recesses receive the two legs of the hasp 14 with the recess 36 being deeper than the recess 38 in order to accommodate the longer pivotal leg of the hasp when it is in a locked position. A third recess 40, in the rear of the block and located generally between the first two recesses, accommodates the cylinder case 28. The forward end of the recess 40 terminates in a cylindrical chamber in which is mounted a barrel 42 drivingly connected to the plug 30.

The barrel 42 has a generally cylindrical configuration and is formed with a pair of channels 44 and 46 extending longitudinally along opposite sides thereof. These channels are arcuate in a cross section with the channel 44 being somewhat deeper than the channel 46. Openings 48 and 50 formed in the block 34 communicate with the recesses 36 and 38 and accommodate a pair of steel balls 52 and 54. The ball 54 is prevented from moving entirely out of its opening by reason of a restriction 55 in the opening 50 on the side of the recess 38.

Figure 5:
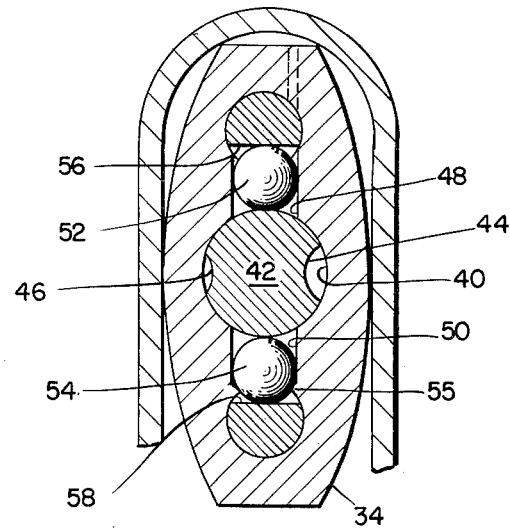
FIG. 5 is a fragmentary cross-sectional view showing the hasp locking mechanism in the closed and locked position, and, FIG. 6 is an exploded perspective view of a portion of the counter mechanism.

It will be noted in FIG. 2 that the legs of the hasp are formed with oppositely facing indents 56 and 58 in which the balls 52 and 54 are seated when the hasp is pushed into the body and the barrel 42 rotated a quarter turn by means of the key 32 actuating the lock mechanism. As is clear in FIG. 5, with the hasp in the closed position, the balls 52 and 54 will be forced into the hasp indents 56 and 58 by rotation of the barrel 42. By rotating the barrel a quarter turn the balls, restrained in their openings 48 and 50, will be forced out of their channels 44 and 46 and will ride onto the outer cylindrical surface of the barrel. With the balls lodged in the position shown in FIG. 5 a positive locking arrangement is provided for the hasp.

Figure 4:
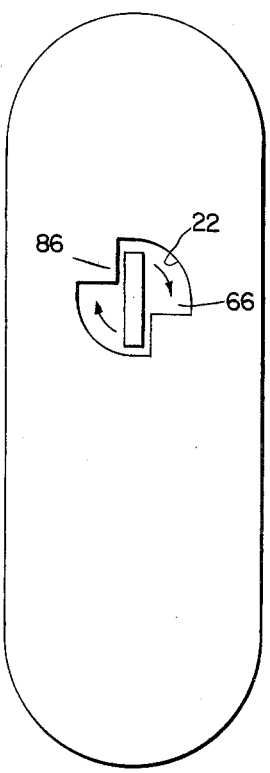
FIG. 4 is a view in end elevation of the device.

When the lock is to be opened, the key 32 is inserted in the lock mechanism and turned a quarter turn in a counter clockwise direction as viewed in FIG. 4 so as to return the barrel to its original position. With the channels in register with the openings 48 and 50, the balls are permitted to move out of locking engagement with the hasp. The mechanism is of simple construction, smooth working and completely reliable. Once locked, the lock cannot be forced open without destroying it.

The pivotal leg of the hasp will be seen in FIG. 2 to have a recessed track 60 extending between the indent 56 and an annular groove 62 near the end of the leg. The groove 62 defines an annular shoulder 64 which, in cooperation with the ball 52, limits the outward movement of the hasp while permitting the hasp to be rotated 360° when in the extended open position shown in FIG. 2.

Referring now more particularly to the counter 26 and its actuating mechanism, it will be seen in FIGS. 2 and 3 that a ratchet wheel 66 is mounted fast to the rear face of the plug 30 and rotates with it through a 90° arc. A link 68 is pivotally and eccentrically connected by its upper end to the wheel 66 by means of a pin 70 and at its lower end pivotally engages a crank 72. The crank in turn is mounted fast to a shaft 74 which drives the counter 26. It will be readily appreciated that a quarter turn of the wheel and plug assembly by means of the key will rotate the counter shaft 74 through a quarter turn and will advance the counter one digit.

To insure that counter will be completely advanced to the next succeeding digit each time the lock is operated a mechanism is provided which makes it necessary to turn the key completely to the end of its movement in a given direction. This mechanism includes the ratchet wheel 66 and a pawl 76 which is pivotally mounted to the rear face of the block 34 by means of a pin 78. The lower end of the pawl engages with the ratchet portion 80 of the wheel 66 and it is normally restrained in the position shown in FIG. 3 by means of a pair of springs 82. The springs are mounted on the block 34 by a pair of pins 84, one on either side of the pawl. One leg of each spring bears against the upper end of the pawl while its other leg is locked against the side of the block 34. It will be readily understood that once the key is turned in the lock, it must complete its movement before it can be returned. The pawl and ratchet mechanism thus permits rotation of the plug in both directions but only after a completed turn in any one direction. Rotation of the key in the lock is limited to a 90° arc with stops being provided by right angular segments 86 forming part of the jacket 16 and extending into the key opening 22.

To obviate cycling the counter as a possible means of avoiding detection in the unauthorized operation of the lock, the counter is constructed in such a manner that the recording mechanism becomes inoperative after it reaches a predetermined number. This makes it impossible to return the counter to its original setting by repeated turning of the key. In practice, when the digit series on the left as viewed in FIG. 2 ultimately reaches 9 that series can no longer advance and the entire lock is returned to the factory where it is opened and the counter reset to zero. With a five digit counter, the lock may be operated 89,999 times before being returned for resetting.

Referring now more particularly to FIG. 6 there is illustrated a counter mechanism of a generally conventional design but modified in such a manner to prevent its advancement after it has been indexed a predetermined number of times. As shown, the operating mechanism of the counter includes a series of separate counter rings 91, 92, 93, 94 and 95, each provided with Arabic numerals from 0–9 spaced about their outer cylindrical surfaces. Starting from the left in FIG. 6, the first four rings are formed each with a geared flange 96, each in mesh with one of a series of small gears 98 separately rotatable along a common shaft 100. Ring 95, being the last one on the right in FIG. 6, has its inner surface formed with ratchet teeth 102 which cooperate with spring loaded pawls 104 mounted about the periphery of a disc 106 drivingly mounted on the shaft 74.

It will be noted that the rings 92 to 95 are each provided with projecting ears 107 adapted to engage and rotate one of the gears 98 upon completion of a 360° revolution. Each turning of a gear 98, it will be understood, will advance its associated ring in digital increments with the result that an accumulative record of lock operation will be provided by actuation of the shaft 74.

However, to avoid the unauthorized returning of the counter to its original reading by a complete recycling of the counter mechanism through repetitious operation of the lock, the ring 91 is designed to become inoperable upon reaching the figure 9. This is achieved by omitting a section of gear teeth, as indicated at 108, from the flange 96 along a section between the numerals 9 and 0. In this fashion, the ring 91 cannot advance past 9 and the counter cannot be recycled. To avoid the possibility of the lock being left in an accidentally unlocked condition, the key receiving mechanism is arranged to release the key only when the lock and key are in a locked position.

The padlock which has been illustrated and described herein has particular utility in sealing containers of valuable articles against pilferage and the like. By way of example, a shipper might use the lock to advantage by locking his shipment in a container and recording the meter reading which then appears on the lock. This reading may then be transmitted to the receiver for comparison with the meter reading upon arrival of the shipment. If the readings are the same both shipper and receiver have positive proof that the lock was not tampered with in transit. If the readings are not identical, then obviously the parties will be on notice that the lock has been opened without authority.

While the invention has been described with particular reference to the illustrated embodiment, it will be understood that numerous modifications thereto will occur to those skilled in the art. It will also be understood that the above description and accompanying drawings should be taken as illustrative of the invention rather than in a limiting sense.

Having thus described my invention, what I claim and desire to obtain by Letters Patent of the United States is:

1. A padlock, comprising a casing, a hasp connected to said casing for locked and unlocked engagement therewith, locking means for locking said hasp to said casing, counter-action means connected with said locking means for restricting a return movement of said locking means from one position to another only upon completion of a locking or unlocking movement, a limited accumulation counter mechanism mounted to said casing and operatively connected with said locking means, said counter mechanism being adapted to be actuated each time said locking means is operated and means preventing recycling of said counter mechanism.

2. A padlock, comprising a casing, a key-receiving barrel mounted for rotary movement in said casing and normally locked against rotation, a hasp connected to said casing for locked and unlocked engagement therewith, means operatively connected with said barrel for locking said hasp to said casing when said barrel is in a normally locked position, counter-action means connected with said locking means for restricting a return movement of said locking means from one position to another only upon completion of a locking or unlocking movement, a limited accumulation counter mechanism operatively connected with said barrel, said counter mechanism being adapted to be actuated each time said barrel is moved from a locked to an unlocked position and means preventing recycling of said counter mechanism.

3. A padlock according to claim 2 including a one-piece outer jacket substantially enclosing said casing and said counter mechanism.

4. A padlock, comprising a casing, a key-receiving barrel mounted for rotary movement in said casing and normally locked against rotation, a hasp connected to said casing for locked and unlocked engagement therewith, means operatively connected with said barrel for locking said hasp to said casing when said barrel is in a normally locked position, counter-action means connected with said locking means for restricting a return movement of said locking means from one position to another only upon completion of a locking or unlocking movement, a limited accumulation counter mechanism operatively connected with said barrel, said counter mechanism being adapted to advance by increments each time said barrel is moved from a locked to an unlocked position and means preventing recycling of said counter mechanism.

5. A padlock, comprising a casing, a key-receiving barrel mounted for limited rotary movement in said casing and normally locked against rotation, a hasp connected to said casing for locked and unlocked engagement therewith, means drivingly connected with said barrel for locking said hasp to said casing when said barrel is in a normally locked position, a recording meter operatively connected with said barrel, said meter being adapted to advance incrementally each time said barrel is moved from a locked to an unlocked position, counter-action means connected with said barrel for restricting a return movement of said barrel from one position to another only upon completion of a predetermined movement in either rotary direction, and a one piece outer jacket of tough impervious material substantially enclosing said casing and said meter.

6. A padlock, comprising a casing, a key-receiving barrel mounted for limited rotary movement in said casing and normally locked against rotation, a hasp connected to said casing for locked and unlocked engagement therewith, means operatively associated with said barrel for locking said hasp to said casing when said barrel and said hasp are in normally locked positions, recording means operatively connected with said barrel, said recording means being adapted to record serially each time said barrel is moved from a locked to an unlocked position and counter-action means connected with said barrel for restricting a return movement of said barrel from one position to another only upon completion of a predetermined movement in either rotary direction.

7. A padlock according to claim 6 wherein said hasp is formed with a pair of indents and said first mentioned means includes a pair of spherical elements adapted to be received by said indents upon rotation of said barrel into a normally locked position.

8. A padlock, comprising a casing, a key-receiving barrel mounted for limited rotary movement in said casing and normally locked against rotation, a hasp connected to said casing for locking and unlocking engagement therewith, means operatively associated with said barrel for locking said hasp to said casing when said barrel is in a normally locked position, a recording meter operatively connected with said barrel, said meter being adapted to advance in increments of one each time said barrel is moved from a locked to an unlocked position and counter-action means connected with said barrel for restricting a return movement of said barrel from one position to another only upon completion of a predetermined movement in either rotary direction.

9. A padlock, comprising a casing, a key-receiving barrel mounted for limited rotary movement in said casing and normally locked against rotation, a hasp connected to said casing for locking engagement therewith, means drivingly connected with said barrel for locking said hasp to said casing when said barrel is in a normally locked position, a counter mechanism operatively connected with said barrel, said counter mechanism being adapted to advance one digit each time said barrel is moved from a locked to an unlocked position and counter-action means connected with said barrel for restricting a return movement of said barrel from one position to another only upon completion of a predetermined movement in either rotary direction.

10. A padlock according to claim 9 wherein said counter mechanism is provided with stop means for limiting the advancement of said mechanism after a predetermined number of operations thereof.

11. A padlock comprising a casing, a key-receiving barrel mounted for rotary movement in said casing and normally locked against rotation, a U-shaped hasp connected to and extending from the front face of said casing for locked and unlocked engagement therewith, both legs of said hasp being formed with oppositely facing indents, a generally cylindrical member in operative rotatable engagement with said barrel, said member being formed with lengthwise grooves of semi-circular cross-section and extending along the outer cylindrical surface thereof, a pair of spherical elements mounted in said casing, said elements being adapted to be received in said grooves when said barrel is in an unlocked position and to be trapped in locking relation between the outer cylindrical surface of said member and said hasp indents when said barrel and member are rotated into a locked position, a recording meter mounted to said casing and operatively connected to said barrel, counter-action means mounted on the rear face of said casing and connected with said barrel for restricting a return movement of said barrel from one position to another only upon completion of a predetermined movement in either rotary direction and a tough impervious jacket substantially enclosing said casing, said meter and said counter return means.

References Cited by the Examiner

UNITED STATES PATENTS

| | | | |
|---|---|---|---|
| 98,513 | 1/1870 | Mix | 70—437 |
| 400,316 | 3/1889 | Doremus | 70—437 |
| 551,154 | 12/1895 | Beasley | 70—437 |
| 1,165,545 | 12/1915 | Shipman | 70—437 |
| 1,308,458 | 7/1919 | Voight | 70—437 |
| 1,835,709 | 12/1931 | Jacobi. | |
| 2,460,615 | 2/1949 | Andrew. | |
| 2,715,998 | 8/1955 | Stanley | 235—117 |
| 2,834,195 | 5/1958 | Stackhouse | 70—437 X |

FOREIGN PATENTS 597,332   8/1959   Italy.

ALBERT H. KAMPE, *Primary Examiner.*

M. HENSON WOOD, Jr., *Examiner.*